United States Patent
Melrose et al.

(10) Patent No.: US 7,271,977 B1
(45) Date of Patent: Sep. 18, 2007

(54) METHOD TO COMPENSATE FOR MICROJOG ERROR INDUCED BY LOCALIZED TRACK SQUEEZE

(75) Inventors: Thomas O. Melrose, Longmont, CO (US); Timothy J. Everett, Niwot, CO (US)

(73) Assignee: Maxtor Corporation, Longmont, CO (US)

( * ) Notice: Subject to any disclaimer, the term of this patent is extended or adjusted under 35 U.S.C. 154(b) by 792 days.

(21) Appl. No.: 10/777,778

(22) Filed: Feb. 11, 2004

Related U.S. Application Data

(60) Provisional application No. 60/446,496, filed on Feb. 11, 2003.

(51) Int. Cl.
*G11B 5/596* (2006.01)

(52) U.S. Cl. .................. 360/77.04; 360/77.08; 360/77.02

(58) Field of Classification Search ............ None
See application file for complete search history.

(56) References Cited

U.S. PATENT DOCUMENTS

| | | | |
|---|---|---|---|
| 6,067,205 A | 5/2000 | Mathews et al. | 360/77.04 |
| 6,549,362 B1 | 4/2003 | Melrose et al. | 360/77.04 |
| 6,965,491 B1 | 11/2005 | Perlmutter et al. | 360/77.04 |
| 7,193,809 B1 * | 3/2007 | Allen | 360/77.04 |
| 2002/0039247 A1 * | 4/2002 | Bi et al. | 360/76 |
| 2002/0067567 A1 * | 6/2002 | Szita | 360/77.04 |

\* cited by examiner

*Primary Examiner*—Andrew L. Sniezek
(74) *Attorney, Agent, or Firm*—Myers Bigel Sibley & Sajovec, P.A.

(57) ABSTRACT

A method of reducing microjog errors in a disk drive having a data recording disk with data tracks and a transducer head positionable on the tracks. The head includes a writer element offset from a reader element. To reduce microjog errors, track squeeze is measured at a number of locations across the surface, wherein the squeeze is due to mispositioning of the track relative to neighboring tracks. A microjog distance for the destination track is provided, and a microjog correction value based on the measured track squeeze is calculated. The correction value is applied to the microjog distance to obtain a corrected microjog distance that reduces microjog errors due to track squeeze.

33 Claims, 11 Drawing Sheets

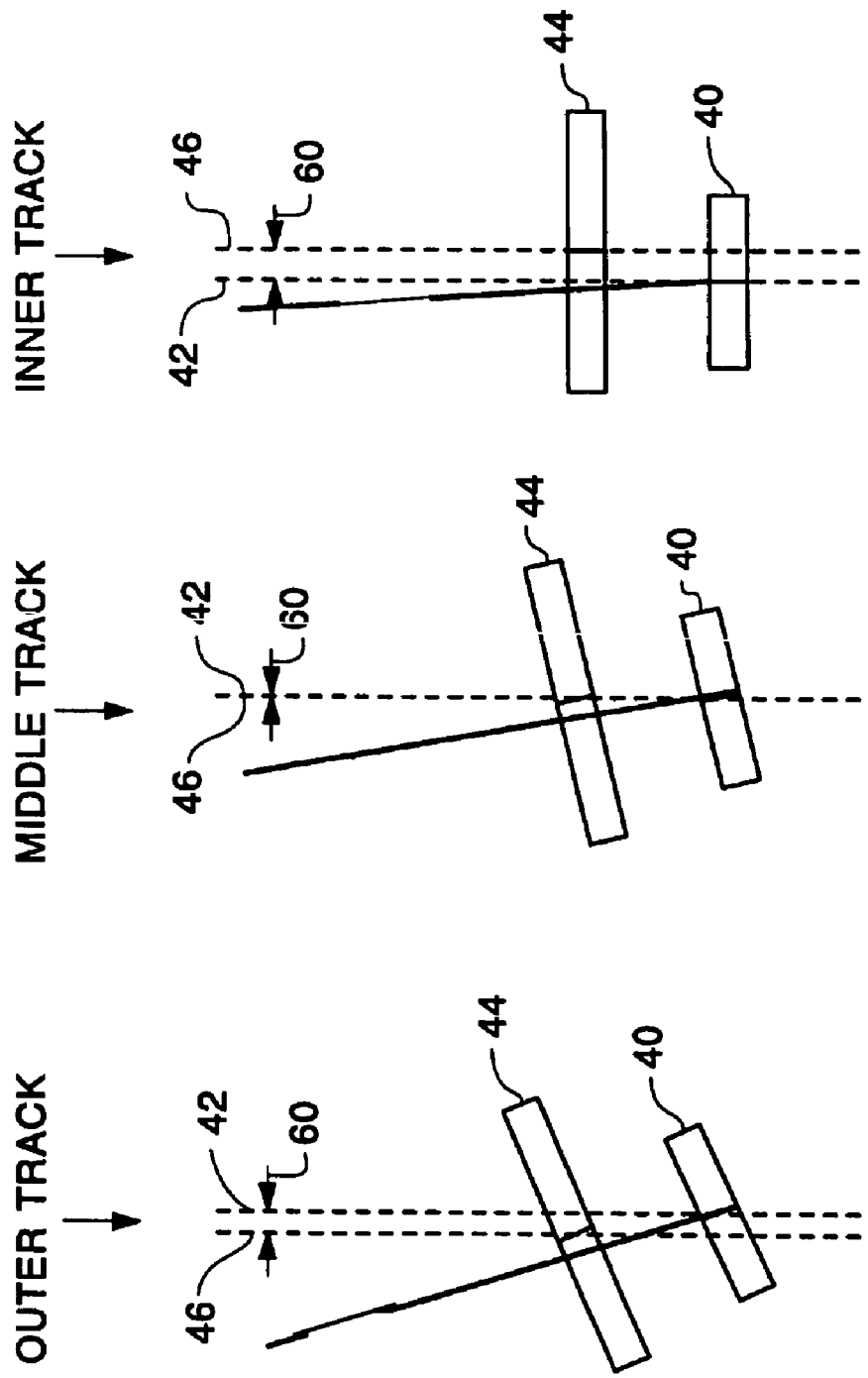

METHOD TO COMPENSATE FOR MICROJOG ERROR INDUCED BY LOCALIZED TRACK SQUEEZE

RELATED APPLICATIONS

Priority is claimed from U.S. Provisional Application No. 60/446,496 entitled "Technique to Compensate for Microjog Error Induced by Localized Squeeze", filed on Feb. 11, 2003, which is incorporated herein by reference.

FIELD OF THE INVENTION

The present invention relates in general to data storage, and in particular to improving data storage reliability in a disk drive.

BACKGROUND OF THE INVENTION

Disk drives are well known in the computer art for providing secondary mass storage with random access. A disk drive essentially comprises one or more magnetic data storage disks rotating on a spindle by a spindle motor, within an enclosed housing. A magnetic transducer head is placed on an actuator arm system and positioned very closely to each data storage surface by a slider suspended upon an air bearing. Servo information is typically written in servo sectors which interrupt data sectors or blocks.

Servo information provides a servo control loop in the disk drive with head position information to enable a head positioner mechanism, such as a rotary voice coil motor, to move the actuator, and therefore the head, from track to track during random access track seeking operations, and to maintain the head in proper alignment with a track centerline during track following operations when user data is written to or read from the available data block storage areas of the disk surface. As such, the servo control loop is used to control head positioning as the head is being moved transversely across tracks by the actuator, and to cause the head to remain over a particular data track as the disk spins. The servo loop controls the acceleration of the head, which results from a force supplied by the electric motor on the actuator.

The inputs to the servo system are readings of head position made by the head itself. The head position is determined from servo information written directly onto the disk e.g. by self-servo writing (SSW) or by a servo track writer (STW), as part of the manufacturing process. The servo information may include the track number as well as an indication of how far the recording head is from the track center line. That is, a certain amount of information on each track is reserved for indicating position. As the head passes over the indicators, the track over which the head is sitting is determined by the head itself and supplied to the servo system. The indicators are typically at regularly spaced locations.

In an ideal disk drive system, the tracks of the data disk are non-perturbed circles situated about the center of the disk. As such, each of these ideal tracks includes a track centerline that is located at a known constant radius from the disk center. In an actual system, however, it is difficult to write regularly spaced and non-perturbed circular tracks to the data disk. That is, problems, such as vibration, bearing defects and/or inaccuracies in the servo writing process (among other things) cause repeatable and non-repeatable runout while writing track servo sectors, leading to mis-positioned and/or perturbed tracks. The repeatable and non-repeatable runout become written in runout (WRO) when the servo sectors are written.

In one case, the WRO represents mis-positioning of the servo sectors that results in tracks that are written differently from the ideal radially regularly spaced tracks. That is, at least some of the tracks are spaced too close to, or too far apart from, one another. This mis-positioning is referred to as "squeeze" which limits the Off Track Read Capability (OTRC) of the disk drive and can cause encroachment (overwrite), leading to data loss.

Further, magneto-resistive (MR) heads in modern disk drives have a position difference between a reader element and a writer element therein that necessitates use of microjog techniques as is well known to those skilled in the art. The amount of microjog required varies from head to head, and also varies across the stroke due to track skew angle effects. It is not uncommon to have a microjog that is as great as 13 tracks. In such a case, when data is written to a track with the head writer, then the head must be moved 13 tracks to one side for reading data back from that track with the head reader. Typically, a microjog calibration routine determines the microjog at several locations across the head stroke from disk inner diameter (ID) to outer diameter (OD), and then calculates a microjog profile. The microjog profile is then used to move the head, after writing data to a track with the head writer, to read the data back from that track with the head reader. A separate microjog profile is required for each head.

The microjog calibration routine assumes that track density (e.g., tracks per inch or TPI) is kept constant across the head stroke. Small changes in track density due to squeeze have large effects on microjog. For example, where there is 7-tracks of microjog, a 5% change in track density due to squeeze in an area of a data disk, translates into a 35% off-track microjog error condition when attempting to read back data from a track. The amount of track density change is accumulated over the 7 tracks (5*7=35) to cause the 35% microjog error. This problem is becoming increasingly significant as track densities are increased. A side effect of increased track densities is that servo track spacing errors and resulting track squeeze are more significant to data integrity.

There is, therefore, a need for a method to compensate for microjog errors induced by localized track squeeze in disk drives in order to prevent data storage integrity problems.

BRIEF SUMMARY OF THE INVENTION

The present invention addresses, at least, some of the above needs. In one embodiment, the present invention provides a method of reducing microjog errors in a disk drive having a data recording disk with data tracks and a transducer head positionable relative to the tracks. The head includes a writer element offset from a reader element. To reduce microjog errors, track squeeze is measured at a number of tracks, wherein track squeeze is due to mis-positioning of a track relative to neighboring tracks. A microjog distance for a destination track is provided, and a microjog correction value based on the measured track squeeze is calculated. The correction value is applied to the microjog distance to obtain a corrected microjog distance that reduces microjog errors due to track squeeze.

In one embodiment, calculating a microjog correction value based on the track squeeze includes the steps of: fitting the measured squeeze values to a polynomial curve using a least squares fit algorithm (i.e., fitting track squeeze measurements made over multiple tracks to a polynomial curve), determining the polynomial coefficients, and calculating the microjog correction value based on the location of a destination track location and the polynomial coefficients. Further, in one embodiment, the step of calculating the microjog correction value further includes the steps of calculating track squeeze based on the location of the destination track location and the polynomial coefficients, and calculating the microjog correction value as a function of the calculated track squeeze.

Further, in one embodiment, the step of measuring track squeeze includes the steps of measuring the amount of said track mis-positioning. Preferably, the step of measuring the amount of said track mis-positioning includes the steps of measuring average squeeze (WRO) in the track, that represent said track mis-positioning.

The present invention further provides a positioning system for positioning a head relative to a disk including multiple tracks, each track having servo information and data, the head including a reader element and a writer element. The positioning system includes a controller that performs head microjogging on a destination track, such that the destination track is squeezed due to mis-positioning relative to neighboring tracks, wherein the controller microjogs the head by: determining a microjog distance for the destination track, calculating a microjog correction value based on amount of track squeeze, and applying the correction value to the microjog distance to obtain a corrected microjog distance that reduces microjog errors due to track squeeze.

The controller calculates the microjog correction value based on the track squeeze by fitting the measured squeeze values to a polynomial curve using a least squares fit algorithm, determining the polynomial coefficients and calculating the microjog correction value based on the location of the destination track location and the polynomial coefficients. Further, the controller calculates the microjog correction value by calculating track squeeze based on the radial location of the destination track location and the polynomial coefficients, and then calculates the microjog correction value as a function of the calculated track squeeze.

The present invention further provides a disk drive including a data disk with multiple tracks, a head including a reader element and a writer element, and a positioning system described above, for positioning the head over the tracks.

These and other features, aspects and advantages of the present invention will become understood with reference to the following description, appended claims and accompanying figures.

BRIEF DESCRIPTION OF THE DRAWINGS

FIGS. 5, 6, 7 are explanatory diagrams illustrating variations of the offset distance between the center of the read element and the center of the write element for three track locations on the disk;

DETAILED DESCRIPTION OF THE INVENTION

Figure 1:
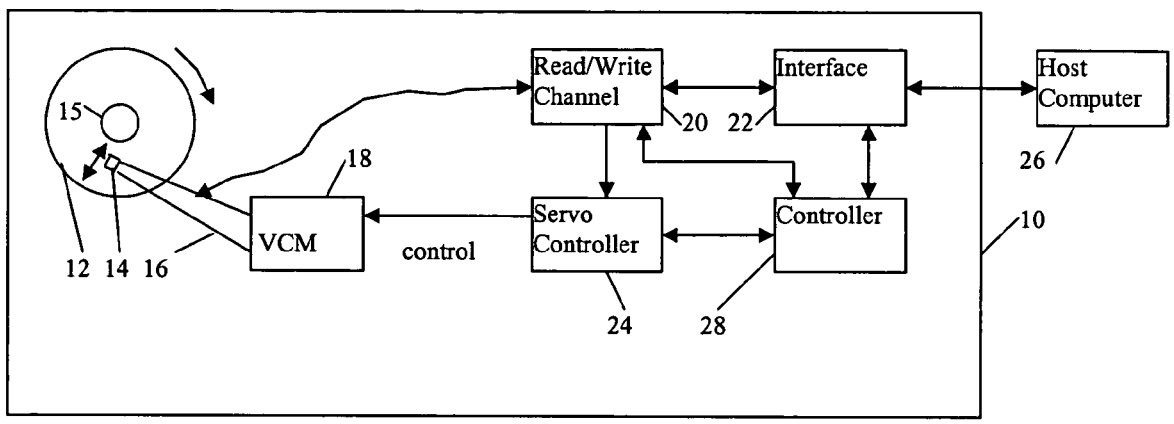
FIG. 1 shows a diagrammatic example of a disk drive in which the present invention may be implemented.

FIG. 1 is a block diagram illustrating an example disk drive 10 in which aspects of an embodiment of the present invention may be implemented. As illustrated, the disk drive 10 can be coupled to an external host computer 26 that uses the disk drive 10 as a mass storage device. It should be appreciated that the blocks illustrated in FIG. 1 are functional in nature and do not necessarily represent discrete hardware elements. For example, in one approach, two or more of the functional blocks within the disk drive 10 are implemented in firmware in a common digital processor. With reference to FIG. 1, the disk drive 10 includes at least one data storage disk 12 having multiple tracks 15, at least one transducer 14, an actuator arm assembly 16, a voice coil motor (VCM) 18, a read/write channel 20, an interface unit 22, a servo controller 24, and disk drive controller 28.

The disk drive 10 receives read and/or write requests from the host computer 26 and carries out the requests by performing data transfers between the at least one disk 12 and the host 26. In a preferred embodiment, the disk drive 10 includes multiple disks 12 in a vertical stack arrangement with one transducer 14 for each operative disk surface. Typically, both surfaces of each disk 12 will be operative for storing user data and, therefore, the disk drive 10 will include two transducers 14 for each disk 12. Single sided disk arrangements can also be used.

The interface unit 22 is operative for providing an interface between the disk drive 10 and the host computer 26. During read and write operations, the interface unit 22 provides a communications path, including data buffering functions, between the host computer 26 and the read/write channel 20. In addition, the interface unit 22 is operative for receiving commands and requests from the host 26 and directing them to the controller 28. The controller 28 then carries out the commands by appropriately controlling the elements within the disk drive 10.

The VCM 18 is operative for controllably positioning the transducers 14 with respect to their corresponding disk surfaces in response to a control signal (e.g., control) generated by the servo controller 24. The transducers 14 are all coupled to a single integrated arm assembly 16 and, thus, move together under the influence of the VCM 18.

When performing a read or write operation, the controller 28 instructs the servo controller 24 to move one of the transducers 14 to a target track on a corresponding disk surface, so that a data transfer can take place. The servo controller 24 then generates a control signal to move the identified transducer 14 from a present location to the indicated target track in a process known as a "seek" operation.

Once the transducer 14 has arrived at the target track, the servo controller 24 enters a "track follow" mode during which the transducer 14 is maintained in a substantially centered position above the target track. The bulk of the data transfer between the transducer 14 and the target track occurs during this track follow mode.

The read/write channel 20 is operative for, among other things, performing the data transformations necessary to provide communication between host computer 26 and the disk 12. For example, during a write operation, the read/write channel 20 converts digital data received from the host computer 26 into an analog write current for delivery to one of the transducers 14. During a read operation, the read/write channel 20 provides the data transformations necessary for converting an analog read signal received from one of the transducers 14 into digital representation that can be recognized by the host computer 26. The read/write channel 20 is also operative for separating out servo information read by a transducer and for directing this servo information to the servo controller 24 for use in positioning the transducer 14.

Figure 2:
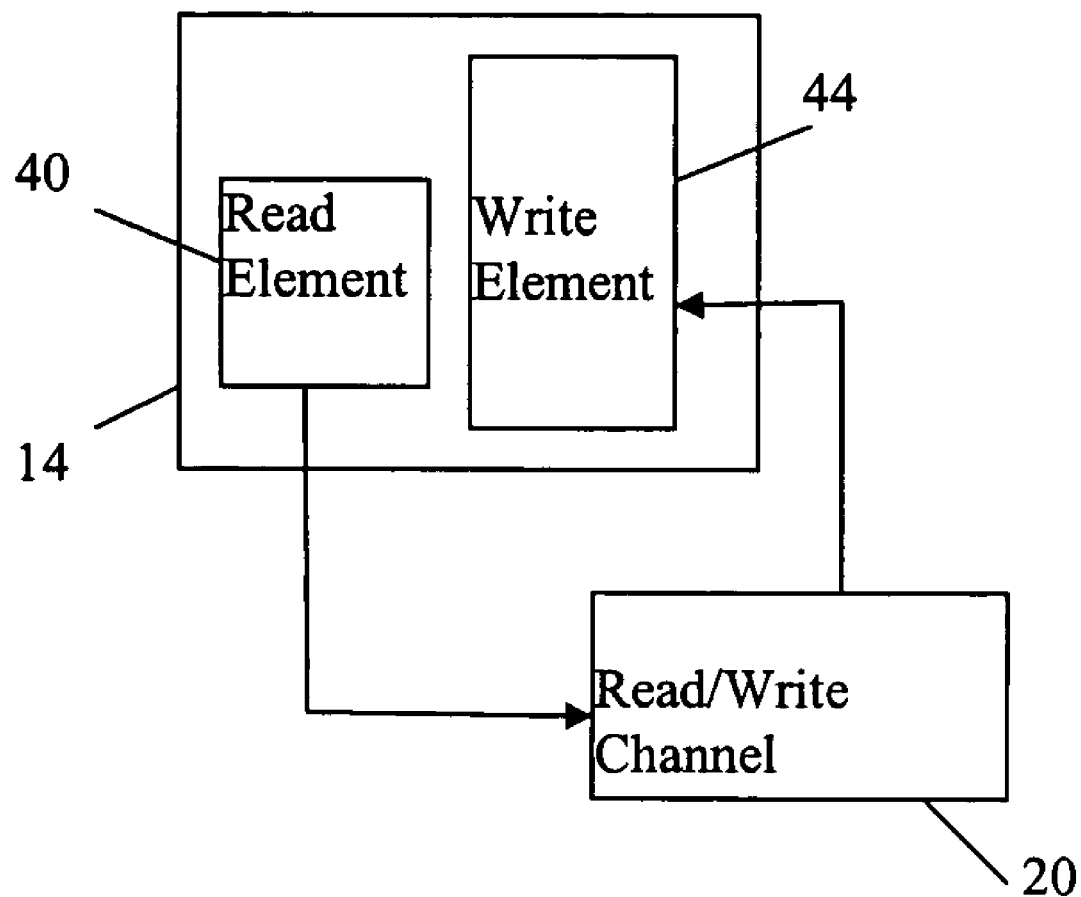
FIG. 2 is an example schematic diagram of a head having a read element and write element.

As shown in FIG. 2, the head 14 includes a read element 40 and a write element 44. During a write operation, the read/write channel 20 drives the write element 44 to write data along a track. During a read operation, the read element 40 senses stored data and outputs data signals that are amplified by the read/write channel 20.

Figure 3:
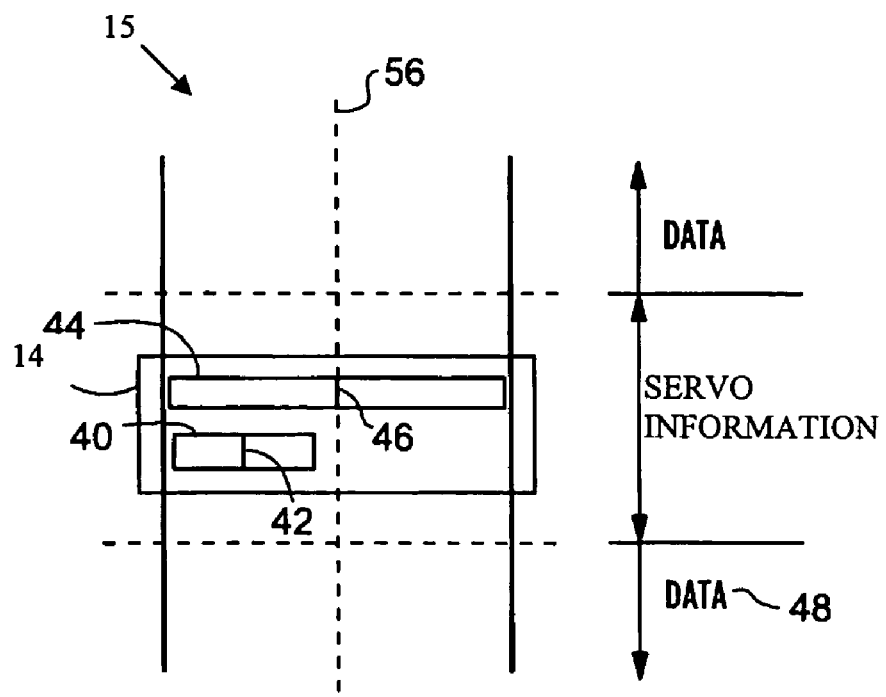
FIG. 3 illustrates the positioning of a write element for a write operation at an inner track location.
Figure 4:
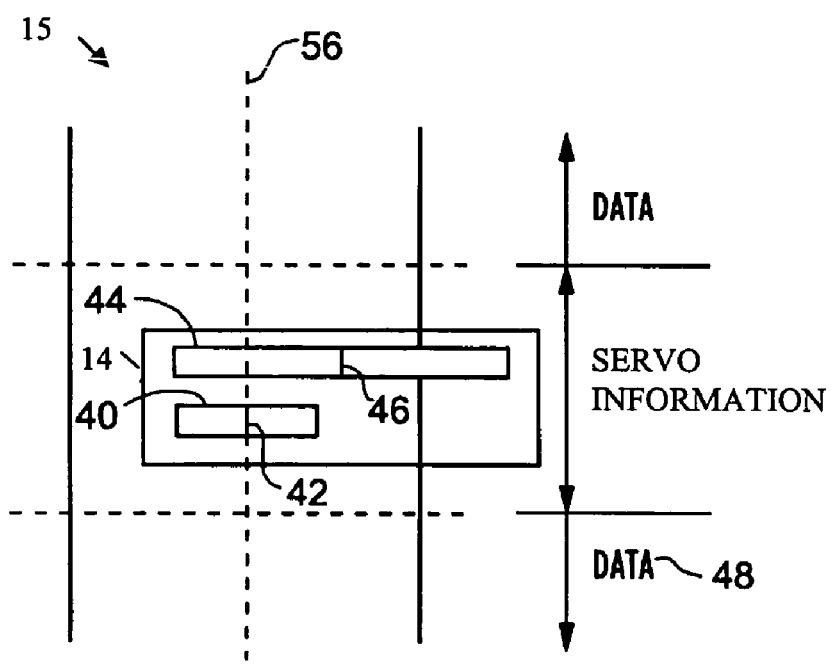
FIG. 4 illustrates the positioning of a read element for a read operation at an inner track location.

FIG. 3 illustrates the positioning of the head 14 along a selected track 15. As illustrated, the read element 40 having a center 42 is offset circumferentially and radially relative to the disk from the write element 44 having a center 46. For a write operation, the write element 44 writes data 48 along a track. The radial position of the data centerline 56 generally corresponds to the center 46 of the write element 44 during the write operation. During a read operation, the center 42 of the read element 40 is centered over the data centerline 56 as illustrated in FIG. 4 to minimize the error rate for reading the data 48. To account for the radial offset between the read and write element centers 42 and 46, the servo controller 24 (FIG. 1) jogs the head 14, so as to position the write element center 46 over the data centerline 56 for a write operation (FIG. 3) and to position the read element center 42 over the data centerline 56 for a read operation (FIG. 4). This process is known to those skilled in the art as microjogging.

The distance that the servo controller 24 jogs the head 14 between a read and a write operation varies with the radial position of the head 14 on the disk 12. With reference to FIGS. 5-7, the variation in the element offset distance 60 between the read and write element centers 42 and 46 is illustrated for exemplary outer, middle, and inner track positions on the disk 12. In the examples shown in FIGS. 5-7, as the head 14 is radially moved from the outer track to the inner track, the read element center 42 transitions from being on one side of the write element center 46 for the outer track (FIG. 5), to being radially aligned with the write element center 46 for the middle track (FIG. 6), and then to being on the other side of the write element center 46 for the inner track (FIG. 7). Other relationships between the read head center and the write head center over the stroke are also possible.

As is known to those skilled in the art, and described by example in U.S. Pat. No. 6,067,205, incorporated herein by reference, the controller 24 jogs the head 14 using a position error signal that is generated from the servo information sensed by the read element 40. In one example, the position error signal for each track is determined by the controller 24 during a drive calibration process. The servo demodulation portion of the read channel 20 generates the position error signal by the read element 40 sensing the servo information and producing a voltage as a function of distance from the track centerline. In another version, the read channel 20 digitizes the servo burst information and passes this information to the controller 24 which then calculates a distance from the track centerline using the digitized servo burst information.

Compensation Method Overview

In one embodiment, the present invention provides a method to compensate for microjog errors induced by localized track squeeze (LTS) on the disk surface in the disk drive. Localized track squeeze occurs where the spacing between tracks over one range of tracks varies from the desired average track spacing for the disk surface. It is not uncommon for this to happen in such a way as not to impact the total number of tracks on the disk. For example, if a range of tracks is squeezed in together by 10% (i.e., tracks too close to one another) and an equal range of tracks is spread out by 10% (i.e., tracks spaced too far apart (also known as negative squeeze)), then there may not be any impact on the total number of tracks on the disk. This effect has been observed, where the tracks are alternately squeezed in and spread out in such a manner that the squeeze profile can be described as a polynomial. As such, said embodiment of a compensation method according to the present invention includes the steps of measuring the squeeze along multiple track locations (e.g., multiple tracks) and then calculating and applying a correction to the microjog precalculated by a calibration routine, in order to essentially compensate for (or cancel out) the effect of squeeze on microjog errors.

Typically, a microjog calibration routine determines the microjog at several locations across the head stroke from disk ID to OD (or visa versa), and then calculates a microjog profile. After writing data to a track with the head writer, the microjog profile is then used to move the head to read the data back from that track with the head reader. The compensation method of the present invention is used to determine, and then apply, a correction to the microjog profile, in order to compensate for the effect of squeeze on the microjog profile, thereby reducing microjog errors.

Squeeze Measurement

Accordingly, in one example implementation, a technique to measure the radial mis-position (squeeze) in tracks includes measuring written in run out (WRO) in servo pattern bursts written by the servo writing process, and then calculating track spacing and squeeze among adjacent tracks. Such a technique is described in U.S. patent application Ser. No. 10/174,484, now U.S. Pat. No. 6,965,491 entitled, "A Method to Correct Radial Misposition of Data Tracks", filed on Jun. 18, 2002, which is incorporated herein by reference.

An example squeeze measurement technique is described below. In one implementation, for each track, the WRO per servo wedge is determined based on combinations of servo bursts at different radial distances from the track centerline in different disk revolutions. Then, the measured WROs of the track servo wedges are combined to obtain a squeeze value for the track relative to an adjacent track. The squeeze value indicates whether the track is radially properly positioned.

Figure 8:
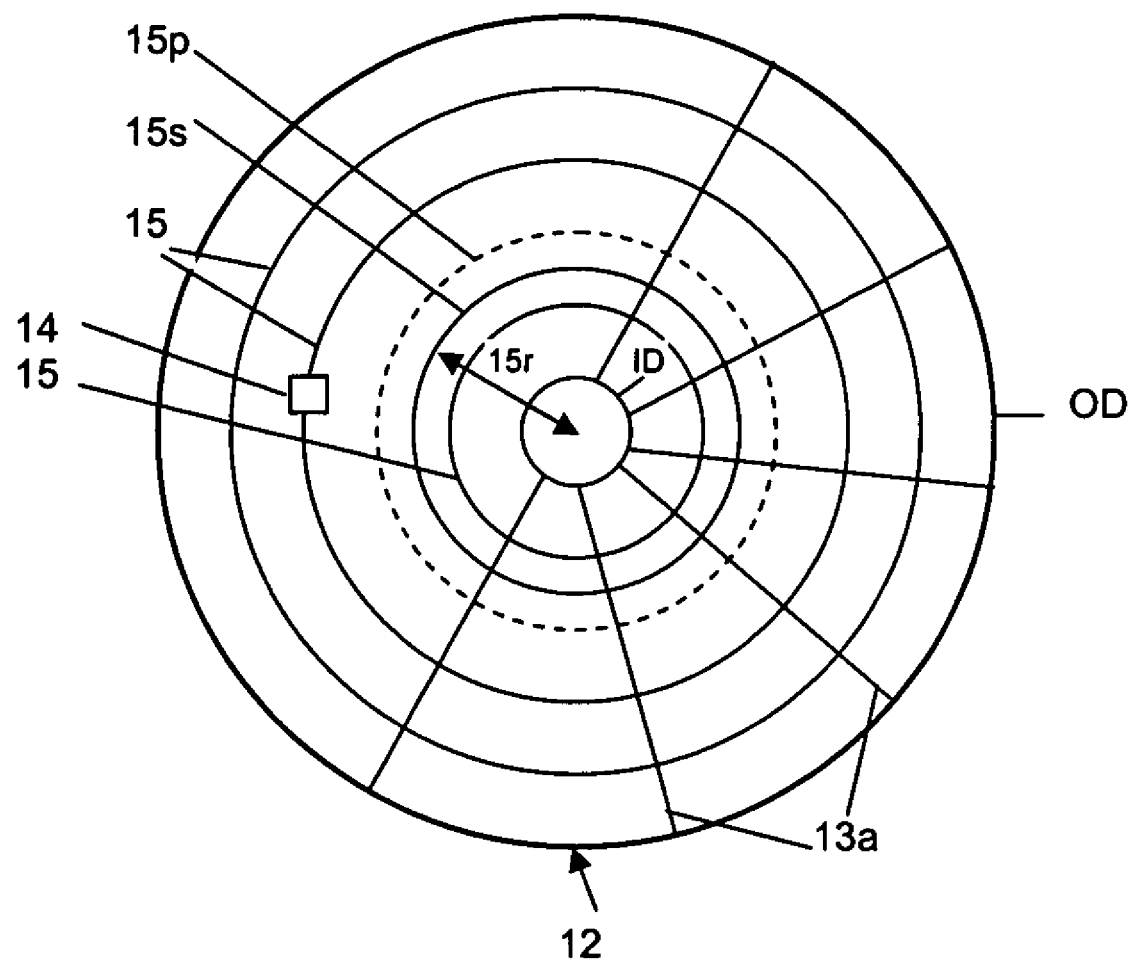
FIG. 8 shows a diagrammatic example of a data disk with several concentric tracks and a servo pattern.

FIG. 8 shows an example data disk 12 with several tracks 15 positioned from the ID to the OD of the disk 12, and a transducer 14 positioned over a track 15. Tracks that are improperly spaced (i.e., exhibiting squeeze) are identified, e.g., in a scan process. Detecting the track spacing uses a combination of servo burst information to determine physical track spacing. As shown in FIG. 8, an improperly spaced, or squeezed, track 15s can include squeeze wherein the radius 15r of the track 15s is too small or too large in relation to adjacent tracks 15, leading to unevenly spaced tracks across at least a portion of the surface of the disk. In FIG. 8, the radius of the example track 15s is too small, wherein the proper position of the track 15s is shown by the dotted circle 15p. A track 15 can also include partial squeeze wherein only portions (e.g., sectors) of the track 15 are written with improper spacing in relation to adjacent tracks such that the track is perturbed from a circular shape but the average radial position of the track is essentially correct.

Figure 9:
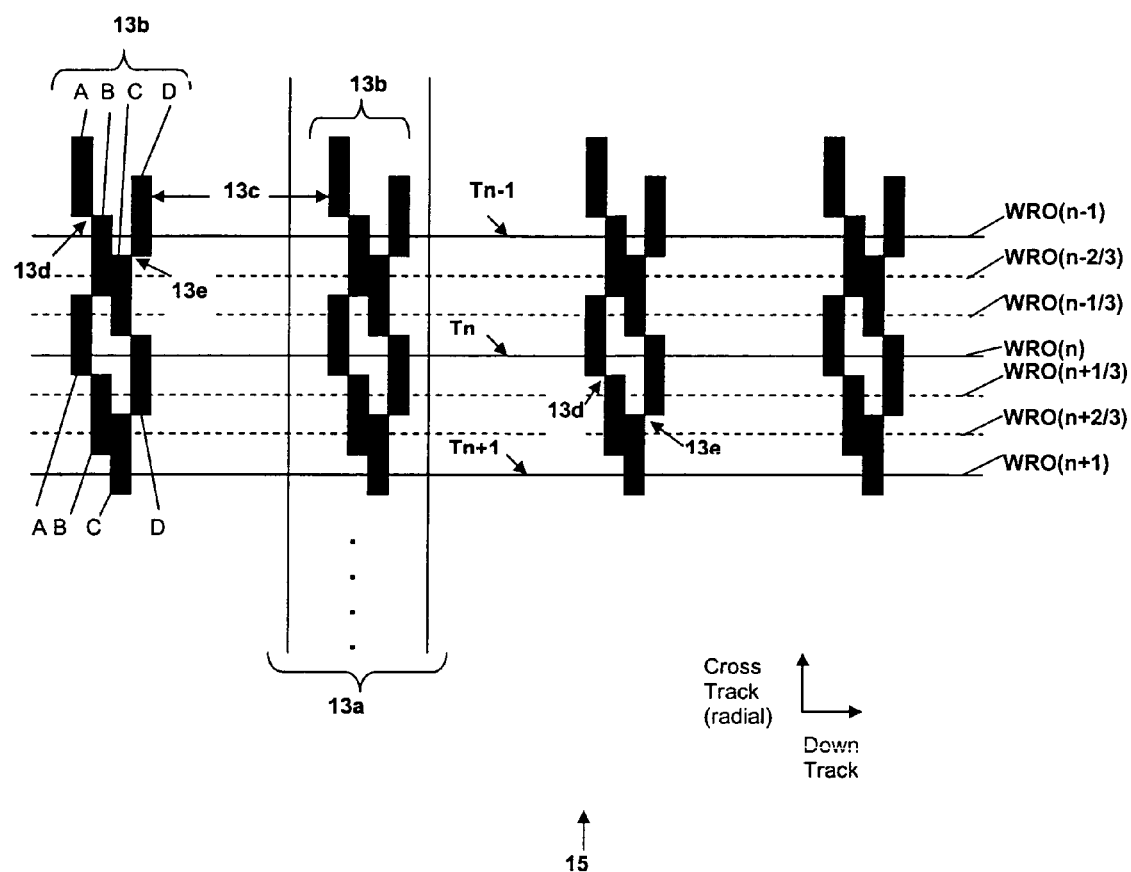
FIG. 9 shows an example set of servo bursts in servo wedges/sectors of the example servo pattern in FIG. 8.

Referring now to FIG. 9 in conjunction with FIG. 8, in another example, the servo information includes servo burst patterns 13c in servo wedges 13b, forming essentially radial spokes 13a around the disk 12 as shown in FIG. 8. Although the example disk 12 in FIG. 8 is illustrated as having a relatively small number of tracks 15 and servo spokes 13a, it can be appreciated that a typical computer disk drive includes a very large number of tracks 15 and many servo spokes 13a.

FIG. 9 illustrates portions of example tracks 15 laid out linearly in down track direction from left to right, and in cross track direction from top to bottom, of the page. Three example centerlines Tn−1, Tn and Tn+1 of three tracks 15 are defined by multiple servo wedges 13b on each track, wherein each servo wedge 13b includes digital information at the beginning of the servo wedge and circumferentially sequential, radially offset servo bursts 13c (e.g., four staggered bursts A, B, C and D) which provide analog information to the servo system for head positioning (other number of bursts and offset configurations are also possible).

In one head positioning example, the signal value from the flux transitions in the servo bursts read by the head 14 is used in a decoding process by demodulating the head signals to form difference values (difference signals) including A–B, and C–D phases. Head position tracking information is decoded by using combinations of the A–B burst phase and the C–D burst phase depending on radial (cross track) location of the head 14 relative to the track centerline. As such, the difference signals can be used in combination to obtain a position error signal (PES) signal for head positioning by the servo system. The PES signal represents the linear portions of the difference signals, indicating direction of head movement for maintaining the head 14 at desired track position (e.g., at a track centerline, 0.25 width from a track centerline, between two track centerlines, etc.).

During a servo writing process, for example, the head 14 is positioned to write burst A, then the head is moved by e.g. ⅔ of track width, to write burst B in a next revolution of the disk 12, trimming off bottom edge of burst A, thereby defining a burst seam (transition) 13d. As such, the servo patter includes trimmed bursts such that burst A is written in a first disk revolution, and then burst A is trimmed when writing burst B in a second disk revolution (position information is created in the second revolution by the trim/write operation). A different pair of disk revolutions create the position information for the C, D burst pair. Burst C is written first, and in a different disk revolution, burst D is written, trimming the edge of burst C, thereby forming another burst seam 13e. As such, in a pair of disk revolutions the A,B burst pair are written, and in a different pair of disk revolutions the C, D burst pair are written.

The motion of the head 14 during the servo writing process defines where the seam 13d between the bursts A and B, and the seam 13e between the bursts C and D occurs. Mispositioning of the seams 13d and 13e causes squeeze. The squeeze values are functions of written in run out (WRO) when the servo bursts were written by the servo writing process. Therefore, to determine track squeeze, the track WRO is measured, and the squeeze (SQ) amount determined based on that WRO.

A version of measuring track spacing and squeeze between tracks based on WRO involves combining the signal values of the servo bursts (e.g., four bursts) in an orthogonal manner compared to the way they are combined for servo PES. The servo burst signal value combinations for PES are proximate the track center where the servo bursts yield a signal with a high slope providing high sensitivity when the head strays from the track center. The orthogonal combination signal of the burst signal values that represents WRO is the converse of the PES and is insensitive to head stray. However, the signal value of the WRO signal is very sensitive to track spacing and, therefore, is a good indication of squeeze. Comparing the WRO of a track to that of other tracks provides information as to whether that track's spacing (relative to adjacent tracks) is higher or lower than the average. A higher, or lower, than average WRO indicates squeeze.

To determine squeeze for a track 15 based on WRO, the WRO for each track servo wedge 13b is determined at multiple track positions (e.g., track write center, and ⅓ and ⅔ track width positions relative to the track write center). Preferably, the WRO measurement is essentially performed at every track location where valid position measurement can be obtained.

In generating the PES, depending on head location relative to a track centerline, different track modes that are based on combinations of the burst difference values are used. As such, examples of determining PES and the corresponding WRO based on track mode for the example four burst servo pattern herein, are based on the following relations:

$$PES1 = F[(A-B)-(C-D)] \quad (1a)$$

$$WRO1 = F[(A-B)+(C-D)] \quad (1b)$$

$$PES2 = F[-(A-B)-(C-D)] \quad (2a)$$

$$WRO2 = F[(A-B)-(C-D)] \quad (2b)$$

$$PES3 = F[-(A-B)+(C-D)] \quad (3a)$$

$$WRO3 = F[-(A-B)-(C-D)] \quad (3b)$$

$$PES4 = F[(A-B)+(C-D)] \quad (4a)$$

$$WRO4 = F[-(A-B)+(C-D)] \quad (4b)$$

wherein each PES and corresponding WRO is a function ("F") of combinations of the A–B and C–D values, as shown by example.

Referring again to FIG. 9, in the above relations, PES1 and WRO1 correspond to head position over a track write center (e.g., Tn−1). PES2 and WRO2 correspond to head position at ⅓ track width from the track write center. PES3 and WRO3 correspond to head position at ⅔ track width from the track write center. And, PES4 and WRO4 correspond to head position at adjacent track center line (e.g., Tn).

In one implementation, squeeze (SQ) can be determined based on the four WRO measurements as follows:

$$SQ=F[WRO1+2\times WRO2+2\times WRO3+WRO4]; \quad (5)$$

In the above example, to determine squeeze for example track number 200, the WRO measurements are retained in memory (for all, e.g. 256, servo wedges around the track), wherein WRO measurements are made and retained for track number 200, track 200+⅓ track width, track 200+⅔ track width and track number 201. Then, the above squeeze calculations are performed over all the servo wedges 13b of a track, and the squeeze values are averaged to obtain the average squeeze for track number 200. In each servo wedge 13b, the WRO for each burst seam therein is determined, and squeeze values SQ determined for all servo wedges 13b according to the above relations. The SQ values are averaged over all servo wedges 13b around the track to provide an averaged SQ value.

Figure 10A:
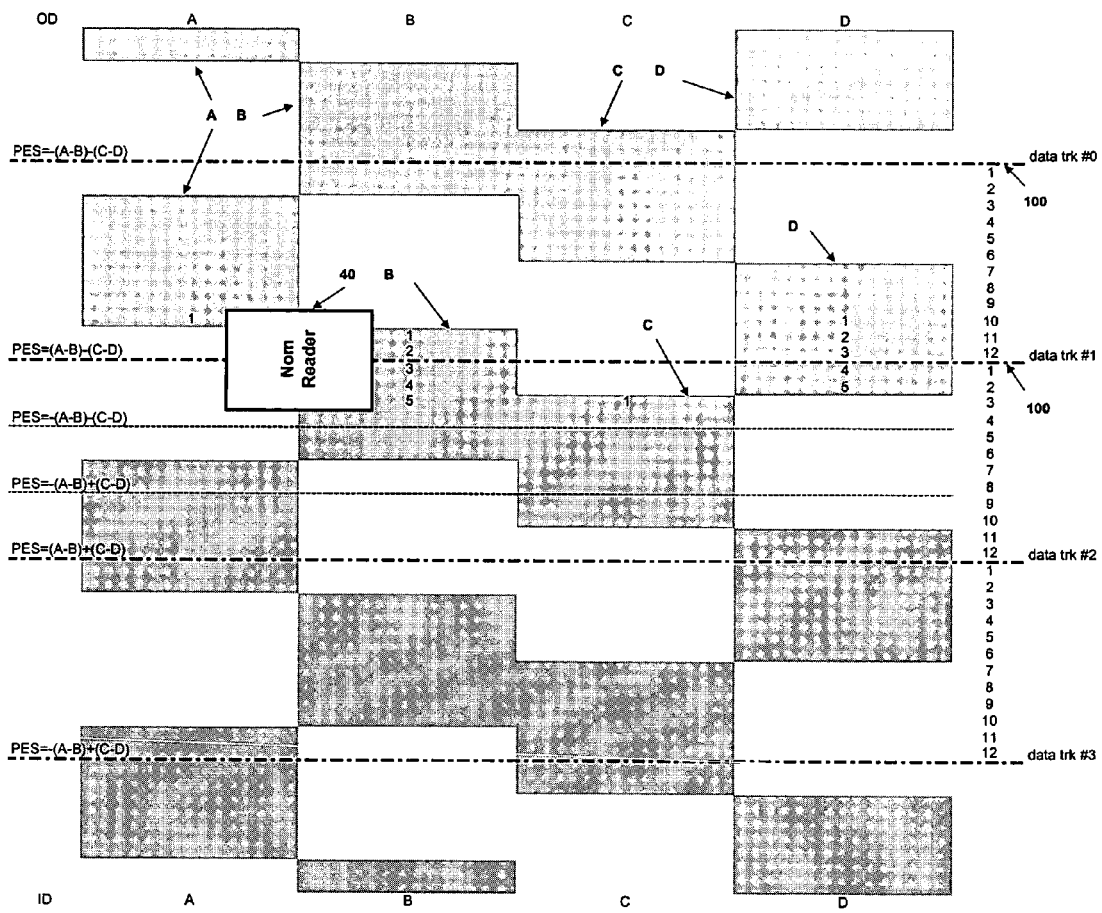
FIG. 10A shows multiple track centerlines defined by example nominal burst placements without squeeze.
Figure 10B:
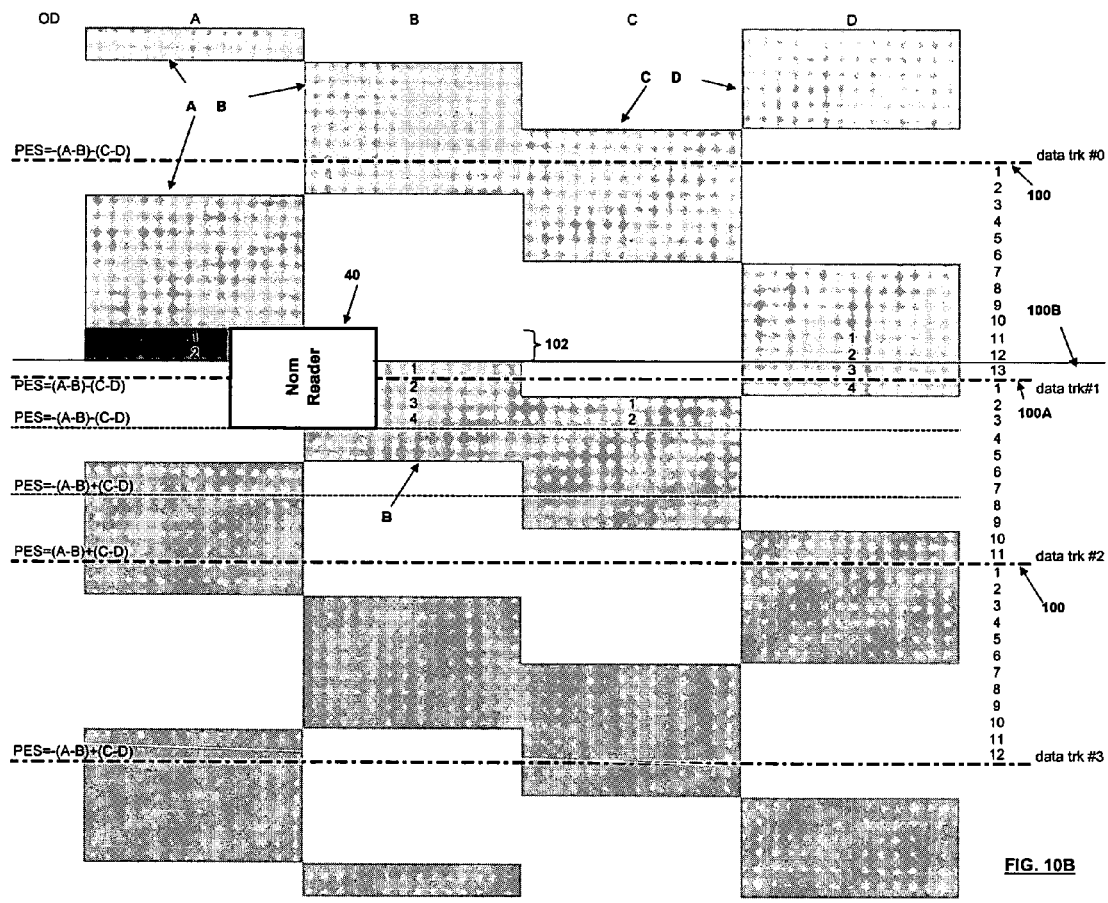
FIG. 10B shows an example burst placement where a burst seam is misplaced whereby a track squeezed.
Figure 10C:
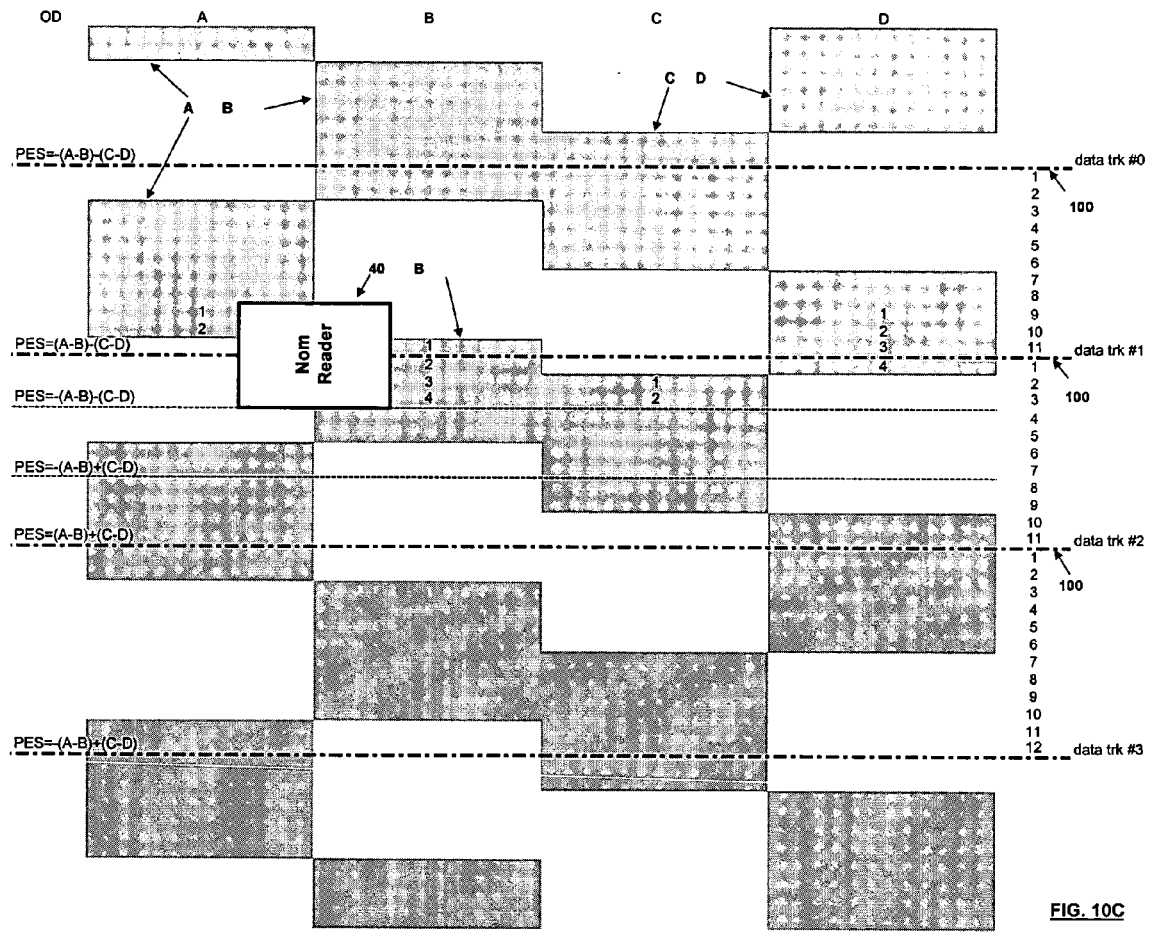
FIG. 10C shows an example burst placement where a range of tracks are misplaced.

FIGS. 10A-C show several example track center lines 100 (e.g., data trk#0 through data trk#3) defined by servo bursts A, B, C and D. FIGS. 10A-C also show the reader element 40 of the head 14, and PES for data trk#0 through data trk#3, and additionally PES at different positions relative to data trk#1.

FIG. 10A shows multiple track centerlines 100 e.g. data trk#0 through data trk#3, defined by example nominal placements of bursts A, B, C and D, without squeeze. The tracks are shown at an arbitrary track spacing value of 12 as indicated by the division marks 1, 2, 3, 4, etc., between adjacent track center lines 100. Similar division marks are shown in FIGS. 10B and 10C.

FIG. 10B shows an example burst placement where a burst seam is misplaced such that a track such as e.g. data trk#1 is squeezed. In this example, the burst seam (A,B seam 102) in each servo wedge of data trk#1 is misplaced and all others (nearby) are nominal as in FIG. 10A (i.e., the main failure mode is caused by a single seam being misplaced). As such, center line 100A of data trk#1 is closer than average to data trk#2 (and farther than average from data trk#0) by a squeeze amount, compared to that in FIG. 10A. The proper centerline position for data trk#1 is center line 100B.

The example in FIG. 10C shows a range of tracks 100 that are squeezed such (e.g., data trk#1 and data trk#2) compared to the nominal in FIG. 10A. Squeeze between adjacent tracks is distributed among several tracks (e.g., 5 or 10 tracks depending on squeeze amount). The tracks are mispositioned such that there is a localized bunching up of tracks. Further, there can be different spacings between different tracks.

Example Compensation Method

To compensate for microjog errors due to squeeze, the squeeze measurements are made in a number of track locations as described above. Then, based on the measured squeeze values corrections are determined and applied to uncompensated microjog values to compensate for errors in microjog induced by localized track squeeze. The uncompensated microjog values are calculated by a known calibration routine (algorithm). In the description herein, uncompensated and compensated microjog values are equivalent to uncorrected and corrected microjog values, respectively.

The microjog calibration routine determines the microjog at several locations (e.g., tracks) across the head stroke from disk ID to OD (or visa versa), and then calculates a microjog profile. After writing data to a track with the head writer, the microjog profile is used to move the head to read the data back from that track with the head reader. The compensation method determines correction values for the calculated microjog values based on measured squeeze values, wherein the correction values are applied to the microjog profile to reduce or eliminate microjog errors due to squeeze.

In one example implementation, after squeeze measurements are made as described by example above, the measured squeeze values are fitted to a polynomial curve using a least squares fit algorithm. The polynomial coefficients are then saved (e.g., to disk) and read back to memory on every power-on. Then, at the beginning of a read seek to a track, the disk drive firmware calculates the appropriate, uncompensated, microjog for the track based on skew angle and calibration data. Once the uncompensated microjog value is determined using existing algorithms, values for the amount of track squeeze are calculated based on the destination track location and the above polynomial coefficients. The uncompensated microjog value is then multiplied by the squeeze value to determine the corrected (i.e., compensated) microjog value.

In one version, the curve fit is a fifth order polynomial as described below, however any other polynomial order can also be used depending on the complexity of the squeeze variation as well as constraints on memory and processing time. In this manner, the microjog error due to squeeze is reduced or essentially eliminated, even though the squeeze itself is not removed from the tracks.

Figure 11:
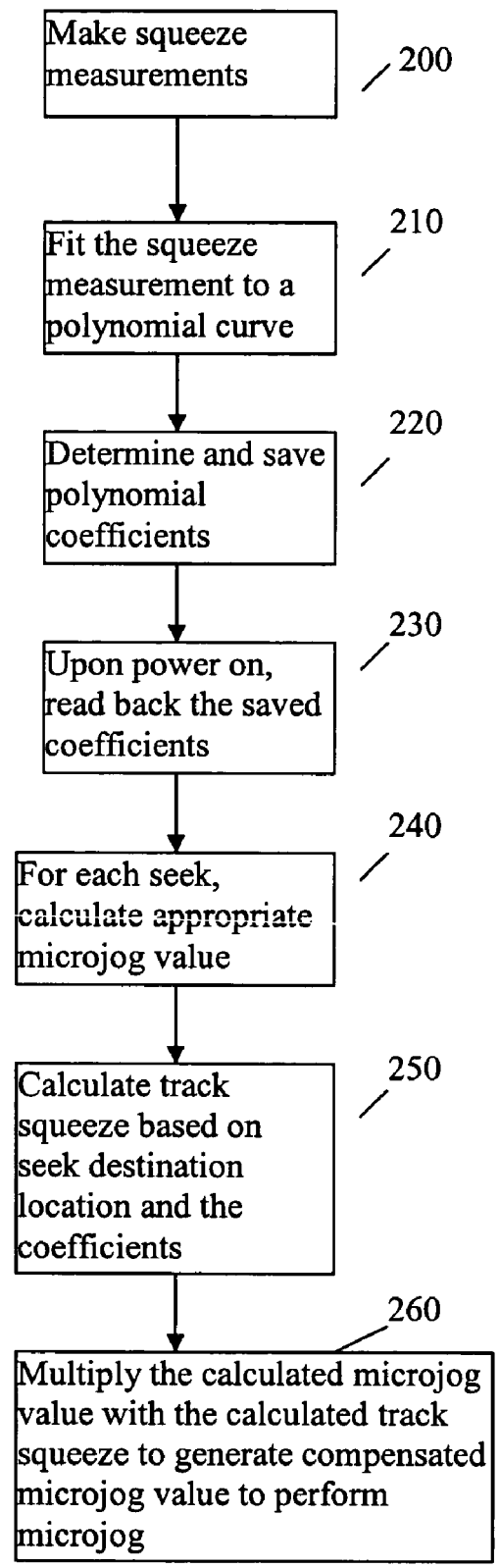
FIG. 11 shows a flowchart of the steps of an example compensation method according to the present invention; and, FIG. 12 shows two example graphs that show percent squeeze per cylinder and the corresponding number of data read errors, respectively.

Referring to the flowchart in FIG. 11, an example method according to one embodiment of the present invention includes the steps of making squeeze value measurements in a number of locations within tracks of interest as described above (step 200). Then, the squeeze measurements are fitted to a polynomial curve using a least squares fit algorithm to obtain polynomial coefficients (step 210). The polynomial coefficients generated by the least squares fit algorithm are a set of values $\{a_0, a_1, a_2, \ldots, a_n\}$ which, when used in a polynomial function of the form $y=a_0x^n+a_1x^{n-1}+\ldots+a_nx$, translate from track radius x to track squeeze y. In the polynomial function, n is the order of the polynomial, wherein for a $5^{th}$ order fit, n=5.

As such, if there are k measured squeeze values $\{z_1, z_2, \ldots, z_k\}$ at corresponding track radii $\{x_1, x_2, \ldots, x_k\}$ then the coefficients $\{a_0, a_1, \ldots, a_n\}$ are the solution to the relation:

$$\min\left(\sum_{i=1}^{k}(z_i - f(x_i, a_0, a_1, \ldots, a_n))^2\right) \quad (6)$$

wherein $f(x_i, a_0, a_1, \ldots, a_n)$ is the polynomial $a_0x_i^n + a_1x_i^{n-1} + \ldots + a_nx_i$.

Relation (6) represents the minimization of the sum of the squares of the differences between the measured squeeze values and the calculated squeeze values. The coefficients that provide minimum errors between the measured and calculated squeeze values are selected, whereby in effect the curve that most closely matches the input data is selected as output. Therefore, the input data to the curve fit is the measured squeeze values and their corresponding track locations, whereas the output data is the polynomial coefficients. As known to those skilled in the art, the solution to relation (6) can be found by any of several well-established methods usually referred to as least squares fit algorithms.

The selected polynomial coefficients are then saved to disk (step 220) and read back into memory on every power-on (step 230). At the beginning of a read seek to the track area of interest, the drive firmware calculates the appropriate microjog for the destination location based on skew angle and calibration data (step 240). Once the uncompensated microjog value is determined using existing algorithms, the amount of track squeeze is calculated based on: (1) the destination location and (2) the saved polynomial squeeze coefficients (step 250). In one example, radial locations on the disk are represented by cylinder (or track) numbers. Low cylinder numbers are toward the OD of the disk and large cylinder numbers are towards the ID of the disk. To calculate SQx for cylinder x, the polynomial equation from above is used, wherein:

$$SQx = a_0 x^n + a_1 x^{n-1} + \ldots + a_n x.$$

The uncompensated microjog value is then multiplied by the track squeeze value SQx above to determine the corrected microjog value and microjogging is performed using the corrected microjog value (step 260). Corrected microjog is simply the uncorrected microjog multiplied by the track squeeze SQx as follows:

$$(\text{corrected microjog}) = (\text{uncorrected microjog}) * SQx$$

The track squeeze SQx, as it is used in this example, is equal to normalized track density. If the track density (e.g., TPI) is nominal, then the squeeze is 1.0. If the track density is 10% denser than nominal, then squeeze equals 1.1. If the track density is 10% less dense than nominal then squeeze equals 0.9.

As discussed, microjog corresponds to a physical separation between the reader and writer elements 40 and 44 respectively. If a microjog profile is stored in terms of tracks, it will only be accurate where the track density is nominal. For example, if a particular track has a reader/writer separation of 5 micro inches and this corresponds to 5 tracks at nominal track density, then the microjog profile will indicate a microjog value of 5 tracks for that track. If the actual track density is 10% greater (i.e., tracks are narrower than nominal) at that location, then using a microjog value of 5 tracks would actually correspond to a physical distance less than 5 micro inches. Multiplying the uncorrected microjog value by the actual track density provides the corrected microjog value in tracks that essentially eliminates microjog error due to squeeze.

In the example description herein, squeeze measurements referred to are measurements of track squeeze. Further, "cylinder" applies to surfaces of multiple disks 12 in the disk drive 10 at a radial location, whereas "track" refers to a single surface/head at that radial location. For example there will be multiple microjog values for a given cylinder (one for each head) but only one microjog value for a particular track. Therefore, during a self-test process, which is a one time process performed in the factory, the following steps are performed: (1) measuring track squeeze at multiple track locations spread out over the range of cylinders that are to be corrected, (2) fitting the measurement data to a polynomial function and determining the polynomial coefficients; and (3) storing the polynomial coefficients to disk. Thereafter, as mentioned above, during disk drive power-up, the saved polynomial coefficients are loaded from disk into memory. During seek operations to cylinders in the regions of correction, the corresponding polynomial coefficients are used to calculate an estimate of track squeeze for the destination cylinder, and the estimates of track squeeze are multiplied by the uncorrected microjog value to obtain corrected microjog value.

In this example, track squeeze is measured at a few cylinders of interest and, then, the measurements are used to generate a polynomial curve that covers all of the cylinders of interest. Because track squeeze is calculated for cylinders that are not measured, the result is a best estimate of track squeeze on those cylinders that are not measured, based on squeeze measurements made on their neighboring cylinders.

In one example, WRO measurements can be performed e.g., over a range of 10 tracks or 100 tracks to determine the squeeze values in the area. The squeeze values are multiplied by the known microjog displacement of the selected head, and the microjog error is calculated. As such, there is no need to determine a microjog profile at all points down track. Once a number of points along the track are performed using the WRO measurement technique, a curve is fit to the measurements, and the microjog profile is processed to fit that curve. Therefore, in a disk drive with squeeze in areas of the disk, the microjog error has been reduced or essentially eliminated, making the disk drive, that would have otherwise failed quality tests, useable. Though the track squeeze is not changed, the microjog profile is modified to compensate for the squeeze, and the microjog error due to the squeeze is eliminated.

Another example implementation includes measuring squeeze at N cylinders at the OD of the disk 12. This involves measuring WRO every 25% of a servo track over a range of cylinders (i.e., four WRO measurements $WRO_1$, $WRO_2$, $WRO_3$ and $WRO_4$), where WRO is "conjugate" of PES. For example, if PES=(A–B)–(C–D) then WRO=(A–B)+(C–D), such that WRO is the orthogonal combinations of said burst phases. The squeeze is calculated as:

For one cylinder:

$$\text{Squeeze} = WRO_1 + 2*WRO_2 + 2*WRO_3 + WRO_4.$$

For the next cylinder:

$$\text{Squeeze} = WRO_4 + 2*WRO_5 + 2*WRO_6 + WRO_7.$$

Note that $WRO_4$ is the last term on the first cylinder and the first term on the second cylinder. As such, for the two cylinders:

$$\text{Squeeze} = (WRO_1 + 2*WRO_2 + 2*WRO_3 + 2*WRO_4 + 2*WRO_5 + 2*WRO_6 + WRO_7)/2.$$

Therefore, it follows that for m cylinders:

$$\text{Squeeze} = (WRO_1 + 2*WRO_2 + \ldots + 2*WRO_{m*3} + 2*WRO_{m*3+1})/m.$$

Then the squeeze values are normalized, such that:

$$\text{Squeeze}(j) = (\text{Squeeze}(N) - \text{Squeeze}(j))/\text{Squeeze}(N)$$

where j=1 ... N.

This normalization forces zero microjog correction at the end of the corrected region, and therefore provides a clean transition between the regions of corrected and uncorrected microjog. In this example, the squeeze is measured for one head and then applied to all heads, assuming that squeeze is constant down the head stack.

Then a $n^{th}$ order polynomial is fit to the squeeze data to generate n+1 coefficients c, as:

$$c_0 x^n + c_1 x^{n-1} + \ldots + c_n x.$$

The coefficients c are saved and used for microjog compensation as discussed above.

For example, the number of measurements can be 10, the number of cylinders averaged per measurement can be 25 and the polynomial can be a $5^{th}$ order polynomial. Other values are possible and contemplated by the present invention.

In another example, correcting microjog on a track includes the steps of measuring the squeeze on multiple tracks in a set/range of tracks (i.e., by measuring a number of locations around each track of the multiple tracks and then averaging the measurements together to get a squeeze value for each track). Thereafter, for other tracks, instead of measuring the squeeze on each track, the squeeze is calculated from a polynomial function based on previous squeeze measurements made on a number of different tracks.

For example, to correct the microjog in a range of e.g., 2000 tracks, a number of squeeze measurements are performed over that range of tracks. Squeeze measurements may be made every 100 tracks. Each of these measurements may entail measuring 5 or 10 tracks in a row and generating an average of the measurements. As such, 20 measurements of squeeze are made, wherein such measurements are spread over the 2000 tracks. Then, the squeeze measurements are converted into microjog corrections (multiplying by the reader to write offset in data tracks), fitted to a polynomial (i.e., estimating track squeeze using the previously measured track squeeze data), and used as a correction to the original microjog profile of the disk drive. The squeeze measurements are average squeeze of one track to another. Squeeze for each servo sector is measured and the measurements are averaged.

An alternative example implementation involves using squeeze measurements from only one (e.g., seek destination) cylinder, or the average of the destination cylinder and its neighboring cylinders, to determine microjog correction values as discussed. In the latter case (i.e., averaging in the neighboring cylinders) provides more accuracy at the expense of additional complexity. In the example implementation described herein, each measured squeeze data point that is used in the polynomial fit is the average of squeeze measurements in several adjacent cylinders.

Figure 12:
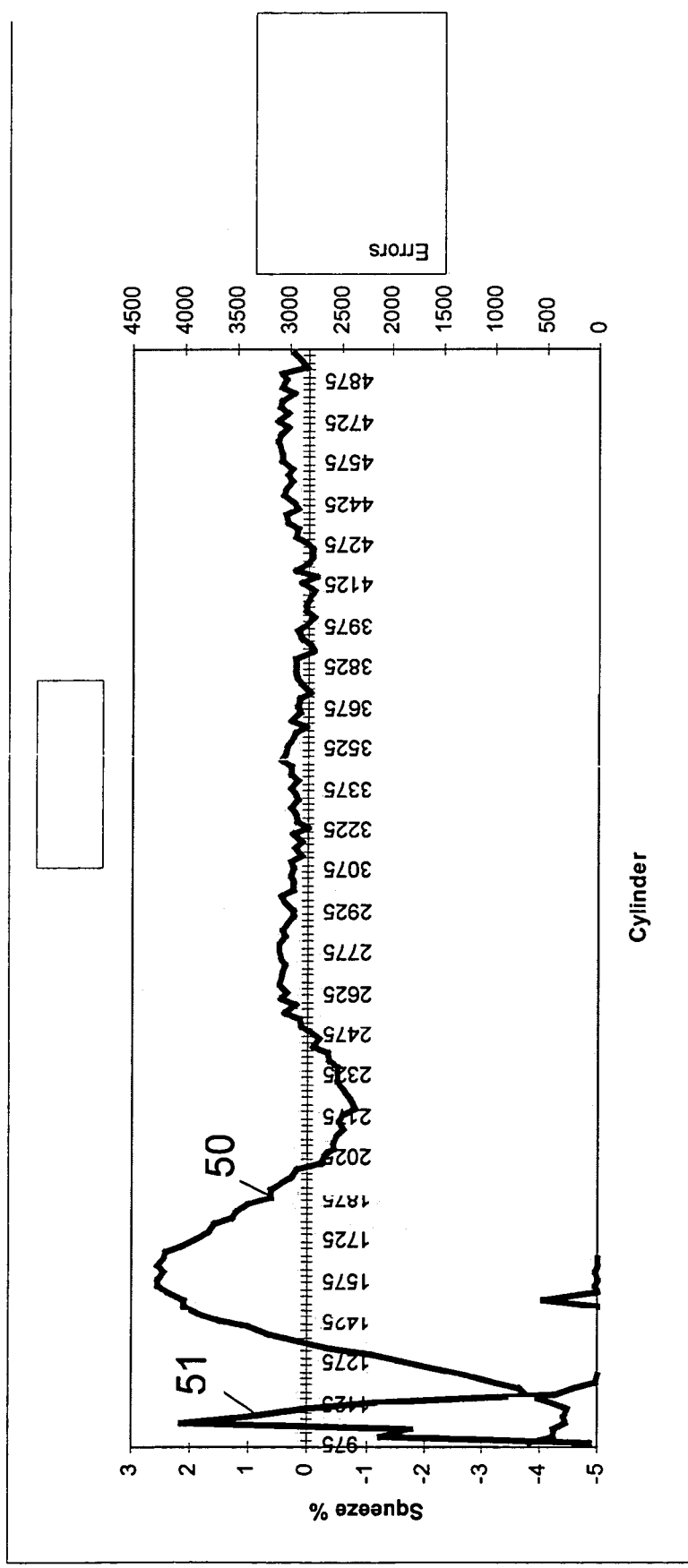

FIG. 12 shows two example graphs 50 and 51, wherein graph 50 represents % squeeze per cylinder, and graph 51 represents the corresponding number of data read errors due to microjog error. The data errors occur when there is more than about −4% squeeze, wherein at −4% squeeze the tracks are positioned farther apart than they should be. This causes a microjog error problem as discussed. A microjog profile is calculated for the track. If the squeeze is localized (e.g., 4% within a few tracks and 4% track to track squeeze error), and reader to writer element offset is 10 tracks wide with uncompensated microjog (i.e., moving the head 10 tracks between reading and writing), then due to the squeeze the reader element would be 40% off track (i.e., 10 tracks×4% squeeze=40% off the track). At such off track position, reliable reading of data cannot be performed, causing data read errors. According to the present invention, the microjog error is compensated for, such that the data errors such as shown in FIG. 12 are reduced or essentially eliminated.

An alternate approach to determining squeeze, is to measure mean square error (MSE) or bit error rate (BER) bathtubs across a track to determine the location of optimal read centers as a direct measure of microjog errors due to squeeze. The optimal locations are used instead of the squeeze measurements as input to the curve fitting algorithm. Although this approach measures the microjog error directly, it can be time consuming. Another alternate approach to correcting the microjog profile, is to insert a DC offset into error correction data fields in the read position, thereby moving the track center by an amount such that the microjog is now correct.

The steps of the above method of the present invention can be implemented, for example, in the disk drive firmware, in ASIC, in the servo controller 26, in the controller 28, as program instructions in memory to be executed by a processor in the disk drive 10, etc.

The present invention has been described in considerable detail with reference to certain preferred versions thereof; however, other versions are possible. Therefore, the spirit and scope of the appended claims should not be limited to the description of the preferred versions contained herein.

What is claimed is:

1. A method of reducing microjog errors in a disk drive including a data recording disk having data tracks and a transducer head positionable on the tracks, wherein the head includes a writer element offset from a reader element, the method comprising the steps of:
    measuring track squeeze at a number of locations along multiple tracks in a set of tracks, wherein the squeeze is due to mis-positioning of the tracks relative to one another;
    providing a microjog distance for a destination track in the set of tracks;
    calculating a microjog correction value for the destination track based on the measured track squeeze;
    applying the correction value to the microjog distance to obtain a corrected microjog distance.

2. The method of claim 1, wherein the step of calculating a microjog correction value based on the track squeeze includes the steps of:
    fitting the measured squeeze values to a polynomial curve using a least squares fit algorithm;
    determining the polynomial coefficients; and
    calculating the microjog correction value based on the location of the destination track location and the polynomial coefficients.

3. The method of claim 2, wherein the step of calculating the microjog correction value further includes the steps of calculating track squeeze based on the location of the destination track location and the polynomial coefficients, and calculating the microjog correction value as a function of the calculated track squeeze.

4. The method of claim 3, wherein the step of applying the correction value to the microjog distance further includes multiplying the calculated track squeeze with the microjog distance to obtain the corrected microjog distance.

5. The method of claim 1, wherein the step of providing a microjog distance for the destination track includes the steps of determining a microjog profile for the destination track.

6. The method of claim 5, wherein the step of applying the correction value to the microjog distance includes the steps of applying the correction value to the microjog profile to obtain a corrected microjog profile for the destination track.

7. The method of claim 1, wherein the step of measuring track squeeze includes the steps of measuring an amount of said track mis-positioning.

8. The method of claim 7, wherein the step of measuring the amount of said track mis-positioning includes the steps of measuring written in runout (WRO) in each of said multiple tracks that represent said track mis-positioning.

9. The method of claim 8, wherein the tracks include a plurality of servo wedges embedded therein, each servo wedge including a plurality of circumferentially sequential, radially offset servo bursts, such that the steps of measuring the WRO in each of said multiple tracks further includes the steps of:
    positioning the head over the track;
    reading the servo bursts in each servo wedge as they pass under the head, to generate readback signals;

measuring burst signal values of the servo bursts from the head readback signals;

selecting a plurality of the servo bursts, and obtaining combinations of the burst signal values of the selected servo bursts to generate one or more burst phases; and determining a WRO value for each servo wedge based on said burst phases, indicating written in runout of the servo bursts relative to neighboring tracks.

10. The method of claim 9, wherein the WRO value is a function of track spacing.

11. The method of claim 10, wherein the WRO comprises an orthogonal combination of said burst phases.

12. A positioning system comprising:
a disk including multiple tracks, each track having servo information and data;
a head including a reader element and a writer element; and
a controller that performs head microjogging on a destination track, such that the destination track is squeezed due to mis-positioning relative to neighboring tracks, wherein the controller microjogs the head by:
determining a microjog distance for the destination track;
calculating a microjog correction value based on amount of track squeeze; and
applying the correction value to the microjog distance to obtain a corrected microjog distance that reduces microjog errors due to track squeeze.

13. The positioning system of claim 12, wherein the controller calculates the microjog correction value based on the track squeeze by fitting measured squeeze values to a polynomial curve using a least squares fit algorithm, determining the polynomial coefficients and calculating the microjog correction value based on the location of the destination track location and the polynomial coefficients.

14. The positioning system of claim 13, wherein the controller calculates the microjog correction value by calculating track squeeze based on the radial location of the destination track location and the polynomial coefficients, and then calculates the microjog correction value as a function of the calculated track squeeze.

15. The positioning system of claim 14, wherein the controller applies the correction value to the microjog distance by multiplying the calculated track squeeze with the microjog distance to obtain the corrected microjog distance.

16. The positioning system of claim 12, wherein the controller determines the microjog distance for the destination track by determining a microjog profile for the destination track.

17. The positioning system of claim 16, wherein the controller applies the correction value to the microjog distance by applying the correction value to the microjog profile to obtain a corrected microjog profile for the destination track.

18. The positioning system of claim 12, wherein the controller determines track squeeze by measuring track squeeze at a number of locations along multiple tracks in a set of tracks, wherein the squeeze is due to mis-positioning the tracks relative to one another.

19. The positioning system of claim 18, wherein the controller measures track squeeze by measuring the amount of said track mis-positioning.

20. The positioning system of claim 19, wherein the controller measures the amount of each track mis-positioning by measuring written in runout (WRO) in each track that represent said track mis-positioning.

21. The positioning system of claim 20, wherein the tracks include a plurality of servo wedges embedded therein, each servo wedge including a plurality of circumferentially sequential, radially offset servo bursts, such that controller measures the WRO in each of the multiple tracks by:
positioning the head over the track;
reading the servo bursts in each servo wedge as they pass under the head, to generate readback signals;
measuring burst signal values of the servo bursts from the head readback signals;
selecting a plurality of the servo bursts, and obtaining combinations of the burst signal values of the selected servo bursts to generate one or more burst phases; and
determining a WRO value for each servo wedge based on said burst phases, indicating written in runout of the servo bursts relative to neighboring tracks.

22. The positioning system of claim 21, wherein the WRO value is a function of track spacing.

23. The positioning system of claim 22, wherein the WRO comprises an orthogonal combination of said burst phases.

24. A disk drive comprising:
a disk including multiple tracks, wherein each track includes servo information and data;
a head including a reader element and a writer element;
an actuator that is controlled to position the head over selected tracks; and
a head positioning system including a controller that controls the actuator to perform head microjogging on a destination track, such that the destination track is squeezed due to mis-positioning relative to neighboring tracks, wherein the controller microjogs the head by:
determining a microjog distance for the destination track;
calculating a microjog correction value based on amount of track squeeze; and
applying the correction value to the microjog distance to obtain a corrected microjog distance that reduces microjog errors due to track squeeze.

25. The disk drive of claim 24, wherein the controller calculates the microjog correction value based on the track squeeze by fitting measured squeeze values to a polynomial curve using a least squares fit algorithm, determining the polynomial coefficients and calculating the microjog correction value based on the location of the destination track location and the polynomial coefficients.

26. The disk drive of claim 25, wherein the controller calculates the microjog correction value by calculating track squeeze based on the radial location of the destination track location and the polynomial coefficients, and then calculates the microjog correction value as a function of the calculated track squeeze.

27. The disk drive of claim 26, wherein the controller applies the correction value to the microjog distance by multiplying the calculated track squeeze with the microjog distance to obtain the corrected microjog distance.

28. The disk drive of claim 24, wherein the controller determines the microjog distance for the destination track by determining a microjog profile for the destination track.

29. The disk drive of claim 28, wherein the controller applies the correction value to the microjog distance by applying the correction value to the microjog profile to obtain a corrected microjog profile for the destination track.

30. The disk drive of claim 24 wherein the controller determines track squeeze by measuring track squeeze at a number of locations along multiple tracks in a set of tracks, wherein the squeeze is due to mis-positioning of the tracks relative to one another.

31. The disk drive of claim 30, wherein the controller measures track squeeze by measuring the amount of said track mis-positioning.

32. The disk drive of claim 31, wherein the controller measures the amount of said track mis-positioning by measuring written in runout (WRO) in the track that represent said track mis-positioning.

33. The disk drive of claim 32, wherein the tracks include a plurality of servo wedges embedded therein, each servo wedge including a plurality of circumferentially sequential, radially offset servo bursts, such that controller measures the WRO in each of the multiple tracks by:

positioning the head over the track;

reading the servo bursts in each servo wedge as they pass under the head, to generate readback signals;

measuring burst signal values of the servo bursts from the head readback signals;

selecting a plurality of the servo bursts, and obtaining combinations of the burst signal values of the selected servo bursts to generate one or more burst phases; and determining a WRO value for each servo wedge based on said burst phases, indicating written in runout of the servo bursts relative to neighboring tracks.

* * * * *